US011400463B2

(12) United States Patent
Van Den Heuvel

(10) Patent No.: US 11,400,463 B2
(45) Date of Patent: Aug. 2, 2022

(54) DOSING DEVICE FOR DOSING A GRANULAR MATERIAL, SPRAYING DEVICE AND METHOD FOR APPLYING A GRANULAR MATERIAL TO A SUBSTRATE

(71) Applicant: Merck Patent GmbH, Darmstadt (DE)

(72) Inventor: Ronald Van Den Heuvel, MH Veldhoven (NL)

(73) Assignee: Merck Patent GmbH, Darmstadt (DE)

( * ) Notice: Subject to any disclaimer, the term of this patent is extended or adjusted under 35 U.S.C. 154(b) by 405 days.

(21) Appl. No.: 16/498,542

(22) PCT Filed: Mar. 14, 2018

(86) PCT No.: PCT/EP2018/056458
§ 371 (c)(1),
(2) Date: Sep. 27, 2019

(87) PCT Pub. No.: WO2018/177755
PCT Pub. Date: Oct. 4, 2018

(65) Prior Publication Data
US 2020/0038888 A1  Feb. 6, 2020

(30) Foreign Application Priority Data
Mar. 29, 2017  (EP) .................................. 17163615

(51) Int. Cl.
*B05B 1/20* (2006.01)
*B05B 7/14* (2006.01)
(Continued)

(52) U.S. Cl.
CPC ................ *B05B 1/20* (2013.01); *B05B 7/144* (2013.01); *B05B 12/122* (2013.01); *B01J 4/02* (2013.01);
(Continued)

(58) Field of Classification Search
CPC ......... B05B 1/20; B05B 7/144; B05B 7/1477; B05B 12/122; B05B 15/25; B05B 16/95; B01J 4/02; B41F 23/06
See application file for complete search history.

(56) References Cited

U.S. PATENT DOCUMENTS 4,227,835 A * 10/1980 Nussbaum .............. B05B 7/144
222/636
4,789,569 A * 12/1988 Douche ................. G01F 13/001
427/180

(Continued)

FOREIGN PATENT DOCUMENTS

DE          2245884 B1   11/1973
JP       2002-181609 A    6/2002

OTHER PUBLICATIONS

International Search Report dated Jun. 1, 2018 issued in corresponding PCT/EP2018/056458 application (3 pages).

(Continued)

*Primary Examiner* — Ryan A Reis
(74) *Attorney, Agent, or Firm* — Millen White Zelano and Branigan, PC; Csaba Henter

(57) ABSTRACT

A dosing device for dosing a granular material containing a reservoir for storing the granular material, a dosing disc, and a suction device and a spraying device containing such a dosing device and a method for applying a granular material to a substrate.

20 Claims, 4 Drawing Sheets

(51) Int. Cl.
*B01J 4/02* (2006.01)
*B41F 23/06* (2006.01)
*B05B 12/12* (2006.01)
*B05B 15/25* (2018.01)
*B05B 16/00* (2018.01)

(52) U.S. Cl.
CPC .............. *B05B 15/25* (2018.02); *B05B 16/95* (2018.02); *B41F 23/06* (2013.01)

(56) References Cited

U.S. PATENT DOCUMENTS

| | | |
|---|---|---|
| 5,104,230 A | 4/1992 | Douche et al. |
| 5,273,584 A * | 12/1993 | Keller ................. B05B 7/144 118/308 |
| 6,257,804 B1 * | 7/2001 | Gathmann ............. B05B 7/144 406/138 |
| 7,674,076 B2 * | 3/2010 | Van Steenkiste ...... B65G 53/48 406/52 |
| 2003/0098943 A1 | 5/2003 | Park et al. |
| 2006/0121817 A1 | 6/2006 | Park et al. |
| 2008/0236702 A1 * | 10/2008 | Platsch ................. G01F 11/24 141/98 |

OTHER PUBLICATIONS

R. Baetens et al., "Properties, Requirements and Possibilities of Smart Windows for Dynamic Daylight and Solar Energy Control in Buildings: A State-of-the-Art Review", Solar Energy Materials & Solar Cells, vol. 94 (2010) pp. 87-105.
English Abstract of JP 2002-181609 A published Jun. 26, 2002.

* cited by examiner

DOSING DEVICE FOR DOSING A GRANULAR MATERIAL, SPRAYING DEVICE AND METHOD FOR APPLYING A GRANULAR MATERIAL TO A SUBSTRATE

The invention relates to a device for dosing a granular material comprising a reservoir for storing the granular material, a dosing disc, and a suction device. Further aspects of the invention relate to a spraying device comprising such a dosing device and a method for applying a granular material to a surface of a substrate.

The review article by R. Baetens et al. "Properties, requirements and possibilities of smart windows for dynamic daylight and solar energy control in buildings: A state-of-the-art review", Solar Energy Materials & Solar Cells 94 (2010) pages 87-105 describes tintable smart windows. Smart windows can make use of several technologies for modulating the transmittance of light such as devices based on electrochromism, liquid crystal (LC) devices and electrophoretic or suspended-particle devices. Liquid crystal based devices employ a change in the orientation of liquid crystal molecules between two conductive electrodes by applying an electric field which results in a change of their transmittance.

Known liquid crystal devices such as LCD display devices comprise two substrates with a liquid crystal layer sandwiched between the two substrates. To maintain a proper thickness of the liquid crystal layer, spacers are distributed inside the gap. Typically, the spacers have a spherical shape with a diameter of 4 µm to 50 µm, wherein for LCD displays typically spacer diameters of 4 µm to 5 µm are used and for LC windows typically spacer diameters of 10 µm to 50 µm are used.

U.S. Pat. No. 7,692,758 B2 describes a method and an apparatus for distributing spacers. The apparatus comprises a stage which is grounded and a substrate to which spacers are to be distributed may be placed on the stage. A nozzle unit which may be moved is arranged above the stage. Spacers in the form of a fine powder are carried with an air stream of gas, such as air or nitrogen to the nozzle. An electrode at the end of the nozzle generates negative ions in the air and charges the spacers. The charged spacers are distributed on the grounded substrate at regular intervals by the repulsive force among each other. A typical spacer density is in the range of from 10 to 2000 particles per $mm^2$.

In order to achieve a regular spacer distribution, a uniform supply of spacers to the nozzle is necessary. From DE 42 37 111 A1 an apparatus for coating of objects with a layer of fine powder is known. The powder is delivered from a reservoir onto a plate that oscillates to deliver powder into a hopper. The powder and air are supplied to a mixing chamber and the air stream comprising the powder is then supplied to nozzles connected to the mixing chamber.

Windows, including LC windows, are usually larger than typical LCD displays and may have areas in excess of several square meters. For liquid crystal based smart windows achieving a uniform distribution of spacers is challenging due to the large size and due to optical defects being easily detected in a window.

A liquid crystal based smart window requires the spacers to be distributed in a regular manner with a low standard deviation of the number of spacers per unit area and no or at least substantially no clusters of spacers. Clusters of several spacers would be directly visible and must be avoided. Further, the standard deviation of the number of spacers should be low in order to avoid areas with little or no spacers resulting in a variation of the gap size causing visual artifacts.

The known apparatuses for distributing spacers do not achieve the necessary low standard deviation of the number of spacers per unit area and the required low number of clusters of spacers. Thus, there is a need for an improved dosing apparatus for dosing particles of a granular material, such as spacers for liquid crystal devices. Further, there is a need for a dosing device with which the time required to deliver the required amount of spacers for coating a substrate (tact time) can be reduced.

A dosing device for dosing a granular material is proposed. The dosing device comprises a reservoir for storing the granular material, a dosing disc, and a suction device. The dosing disc is rotatable around a rotational axis.

The reservoir has a dosing opening facing the dosing disc and the dosing opening is arranged above the dosing disc such that a dosing gap is formed between a surface of the dosing disc and a surface surrounding dosing opening. The dosing opening is arranged eccentric with respect to the rotational axis. The suction device has an opening facing the dosing disc and the opening of the suction device is arranged above the dosing disc and likewise being arranged eccentric with respect to the rotational axis. The size of the dosing gap is chosen such that a monolayer of the particles of the granular material is dosed from the reservoir through the dosing opening onto the surface of the dosing disc and the suction device is constructed and arranged such that the monolayer of particles is being sucked into the suction device and mixed with a gas stream, preferably a constant gas stream, when the particles are being transported to the suction device by rotation of the dosing disc Particles of the granular material are delivered from the reservoir through the dosing opening onto the dosing disc. As the dosing opening is arranged above the dosing disc, the particles fall down onto the dosing disc by means of gravity. The delivery of the particles may be supported by means of an agitator arranged in the reservoir.

If the shape of the dosing opening is a circle, the diameter of the dosing opening is preferably chosen from 2 mm to 20 mm and especially preferred from 5 to 10 mm. Alternatively, the dosing opening may be of any other shape, wherein the size of the dosing opening is defined as the largest dimension and the largest dimension is preferably orientated such that a line extending through this dimension intersects the axis of rotation of the dosing disc. For example, the dosing opening may have an oval shape.

The center of the dosing opening is arranged eccentric with respect to the axis of rotation of the dosing disc. The distance between the center of the dosing opening and the axis of rotation is preferably in the range of from 10 mm to 50 mm. The distance of the center of the opening of the suction device is chosen to be the same as for the dosing opening. The diameter of the opening of the suction devices is adapted to the size of the dosing opening such that the diameter of the opening of the suction device is the same or slightly larger than the diameter of the dosing opening. By choosing the diameter of the opening of the suction device to be larger than the diameter of the dosing opening the intake of environmental gas (air) is increased.

Particles delivered onto the dosing disc are transported to the suction device by rotation of the dosing disc. The distance between the walls surrounding the dosing opening and the surface of the dosing disc defines the size of the dosing gap. The size of the dosing gap is chosen such that only a monolayer of particles may be transported by the dosing disc. The surface of the dosing opening acts like a squeegee which blocks any further layers of particles from following the rotation of the dosing disc and thus blocks the transport of further particles to the suction device. Only a monolayer of the particles is delivered onto the dosing disc having a defined width and height. This monolayer is then transported to the suction device. The width of the monolayer is defined by the diameter of the dosing opening and the height is defined by the size of the particles.

The size of the particles is defined as the diameter of the particles. If the particles have no spherical shape, the size of the particles may be defined as the diameter of the maximum possible circle circumference of the particle. Ideally, all particles of the granular material have the same size. Typically, the particles of the granular material have a certain size distribution. In the following, the term "size of the particles" refers to the average size of the particles. In case of spacers used in optical devices, the particle diameter has only a low tolerance of typically ±1.0% of the nominal particle diameter.

The dosing disc has a flat surface and the dosing opening is arranged with respect to the dosing disc such that the size of the dosing gap varies by less than 10 μm, preferably by less than 5 μm and especially preferred by less than 2 μm when the dosing disc is being rotated.

The speed of rotation of the dosing disc is preferably in the range of 5 to 20 rpm.

Preferably, the surface roughness Ra of the dosing disc is in the range of from 0.1 to 4 μm, especially preferred in the range of from 2 to 3.5 μm. Ra is the arithmetic average of the surface roughness measured along a line profile.

The surface roughness must not be too large in order to keep the variation of the dosing gap size within the preferred limits. However, a certain friction between the dosing disc and the particles of the granular material is considered to be advantageous in order to prevent the particles from slipping of the dosing disc. By providing a surface with defined roughness the particles are prevented from being spun-off at higher rotation speeds.

A suitable material for the dosing disc is stainless steel.

Preferably, the surface of the dosing disc is patterned such that the surface has a plurality of indentations, wherein the shape of the indentations is chosen such that exactly one particle of the granular material fits in one of the indentations. If the particles of the granular material are of spherical shape, the indentations preferably have a spherical shape having a diameter equal to or slightly larger than the diameter of the particles for indentations having a depth of 50% or more of the particle diameter. For indentations having a depths of less than 50% of the particle diameter, the diameter of the indentation may be chosen smaller than the particle diameter.

The uniformness of the monolayer of particles is further increased by use of a dosing disc having a patterned surface. Each indentation defines a space for exactly one particle of the granular material. Additionally, the walls surrounding the dosing opening act as a squeegee and wipe off any additional layer of particles.

If the surface of the dosing disc is not patterned, the size of the gap is defined by the shortest distance between the surface of the dosing disc and the walls surrounding the dosing opening. If the surface of the dosing disc is patterned, the depth of the indentations must be taken into account so that the size of the gap is defined by the sum of the shortest distance between the surface of the dosing disc and the walls surrounding the dosing opening and the depth of the indentations. If not all indentations have the same depths, than the average depth is used.

In order to allow only a monolayer of particles to be transported from below the dosing opening to the suction device, the size of the dosing gap is chosen larger than the average diameter of the particles and smaller than or equal to two times the average diameter of the particles.

The suction device is preferably constructed as a Venturi nozzle. When a stream of air, such as air or nitrogen, is applied to the Venturi nozzle, the particles are sucked into the Venturi nozzle as a sidestream through the opening facing the dosing disc. The stream may be defined by pressure and flow rate. The pressure of the air stream is preferably in the range of from 0.1 to 2 bar, especially preferred in the range of from 0.25 to 1 bar.

The amount of dosed particles per time unit is preferably controlled by choosing parameters selected from the rotational speed of the dosing disc, the size and shape of the dosing opening, the distance between the axis of rotation and the center of the dosing opening and combinations of at least two of these parameters.

The reservoir preferably comprises an agitator for stirring the particles of the granular material and thus supporting the delivery of the particles onto the dosing disc. Preferably, the agitator is arranged in the vicinity of the dosing opening.

Further, it is preferred that the material of the reservoir at least of the inner wall in the vicinity of the dosing opening is made out of electrically non-conductive material, such as a polymer. The agitator may scrape the inner wall of the reservoir and thus release further particles. By use of a non-conductive material contamination of the granular material with conductive particles is avoided. In the case of dosing spacers for use in the manufacture of liquid crystal cells this is advantageous as unwanted electrical shortcuts between the two substrates of the cell are avoided.

The dosing device is preferably arranged in an enclosure and the dosing disc is preferably contained in a dry and/or inert atmosphere, such as nitrogen. A dry environment prevents or at least reduces particle agglomerations. An inert atmosphere, such as nitrogen may be used to ensure a secure dry environment.

A further aspect of the invention is providing a spraying device for applying a granular material to a surface of a substrate. The spraying device comprises one of the described dosing devices. The dosing device supplies a gas stream comprising the granular material. The spraying device further comprises at least one nozzle, at least one supply line connecting the dosing device to the at least one nozzle and means for moving a substrate relative to the at least one nozzle.

The means for moving the substrate relative to the at least one nozzle may for example be a conveyor, wherein the conveyor is constructed and arranged to move the substrate. The conveyor can be any roller, rolls on axis and/or (multiple-single) belt conveyor. Alternatively, the means for moving the substrate may be constructed as a substrate carrier such as a vacuum chuck or a floating table. In a floating table, substrates are lifted and moved by an air flow.

The spraying device may comprise a spray bar and the at least one nozzle may be mounted on the spray bar. The means for moving the substrate relative to the at least one nozzle may be constructed as a translation stage moving the spray bar. If the at least one nozzle is mounted without a spray bar, the at least one nozzle may be mounted to a translation stage.

Further, the spray bar may be mounted on a translation stage. In such an embodiment, the substrate is first conveyed into and out of the spraying chamber by using means for moving the substrate as described above. During application of the granular material, the substrate remains at rest and the translation stage is used as means to move the substrate relative to the at least one nozzle.

Preferably, the means for moving the substrate are constructed such that a speed of movement of the substrate relative to the at least one nozzle is in the range of from 2 m/min to 6 m/min.

The spraying device preferably comprises means for electrostatically charging the particles of the granular material.

Preferably, the means for electrostatically charging the particles comprise the at least one supply line and the at least one supply line is at least partially constructed from an electrically conductive material such that the particles are charged by collisions with the conductive material of the supply line. Preferably, the conductive material is connected to ground potential. The particles are electrostatically charged during their travel from the dosing device to the at least one nozzle (triboelectric effect) while colliding with the walls of the conductive material of the supply lines. Advantageously, the particles having same charge exhibit a repulsion force between the particles that prevents the particles from clustering or agglomerating.

Preferably, the substrate is electrically isolated in the spraying device. The particles adhere on the surface of the substrate. They stick even when the substrate is turned up-side-down and tapped. It is believed that van der Waals forces are responsible for particle adherence.

Preferably, the spraying device comprises a vibration system. The vibration system is constructed and arranged to apply vibrations to the at least one nozzle. Advantageously, the risk of clogging of the nozzles is reduced by the vibrations of the nozzles. Preferably, the at least one nozzle is mounted to a spraying bar and the spraying bar is attached to the vibration system. Advantageously, only one vibration system is required to apply vibrations to all nozzles attached to the spray bar.

The spraying device preferably comprises means for adjusting the distance of the at least one nozzle to the substrate. As the nozzles may be mounted to the spraying bar, the means for adjusting the distance may be constructed and arranged such that the distance of the spraying bar to the substrate is adjusted. Preferably, the distance of the at least one nozzle to the substrate is adjustable in the range of from 25 mm to 500 mm, preferably in the range of from 100 mm to 300 mm and most preferred in the range of from 150 to 250 mm.

The at least one nozzle has an opening angle which defines the shape of the gas stream comprising the particles leaving the nozzle. The opening angle of the at least one nozzle, the distance of the at least one nozzle to the substrate and, if more than one nozzle is present, the distance between two nozzles are preferably chosen such that an aerosol spray comprising the granular material which is generated by the at least one nozzle covers the entire width of the substrate. Preferably, there is no overlap between the aerosol sprays generated by two nozzles if more than one nozzle is present. The distance between two nozzles is also referred to as nozzle stitch.

If more than one nozzle is used, an overlap between the aerosol sprays of two nozzles is to be avoided as the concentration of particles delivered to the substrate is enlarged in the region of overlap. Likewise, a gap between two aerosol sprays of two nozzles should be avoided as no particles or only a reduced concentration of particles would be delivered to the region of the gap.

If the dosing device comprises two or more nozzles, it is preferred to connect each of the nozzles to the dosing device via an individual supply line. Preferably, a distributor is connected to the dosing device and each of the supply lines is connected to the distributer. Further, it is preferred that all supply lines of all nozzles are of equal length. By choosing equal lengths of all supply lines irregularities between the different nozzles are avoided and a more uniform distribution of particles on the substrate is achieved.

In order to avoid contamination of the surroundings with particles of the granular material, the spraying device preferably comprises a spraying chamber. The spraying chamber is constructed to receive a substrate. The at least one nozzle and the means for moving the substrate relative to the at least one nozzle are located within the spraying chamber. The spraying chamber is preferably sealed in order to contain any excess particles inside the spraying chamber.

Further, the spraying chamber is preferably constructed such that the spraying chamber may be easily cleaned. For easy cleaning the spraying chamber has preferably polished surfaces such as electro polished stainless steel or surface of comparable quality. In order to avoid particles sticking to the surfaces of the spraying chamber, the spraying chamber is preferably anti-static or equally charged as the particles in order to create a repulsion effect.

In a further aspect of the invention a method for applying a granular material to a surface of a substrate is provided. The method comprises the steps of supplying the granular material and the substrate to one of the described spraying devices and applying the granular material to the surface of the substrate using the spraying device.

Preferably, the substrate to be processed is a substrate of an optical device, such as a liquid crystal cell. Preferably, the particles of the granular material are spacers for separating two substrates of the optical device.

The optical device may be a switchable window, in particular a switchable liquid crystal window which comprises a liquid crystal cell. Further, the optical device may be a liquid crystal display (LCD). The substrate is preferably of rectangular shape wherein the length of the sides of the rectangle may be in the range of from 5 cm to 500 cm, especially preferred in the range of from 40 cm to 400 cm and most preferred in the range of from 100 cm to 250 cm. Substrates can be of arbitrary shape, wherein rectangular shape is considered to create the highest particle efficiency. For example, a triangle has more "gap" than a rectangle although both substrates have the same starting width.

The inventive devices and methods are capable of delivering the granular material at a higher rate compared to spraying devices and methods used for applying granular material to a surface of a substrate. This allows for a reduction of tact time. The tact time is the time required to deliver the granular material to the substrate with the desired particle distribution. For example, a known device based on swiveling a spacer nozzle multiple times over the substrate in order to achieve an acceptable distribution is able to process a substrate of 1.8 $m^2$ in a tact time of about 14 minutes. The proposed devices and methods allow the processing of a substrate of 1.8 $m^2$ in a tact time of about 30 seconds.

Preferably, the granular material is mixed with nitrogen gas in the dosing device of the spraying device. Nitrogen is preferred in order to ensure a dry environment. Alternatively, compressed clean dry air may also be used. While compressed dry air is suitable as propellant, an extra benefit of using nitrogen as propellant is the prevention of creating a potential (dust) combustion, by the absence of oxygen The proposed dosing device, the proposed spraying device and the proposed method may be used for a wide range of spherical and nonspherical granulates made from, for example, synthetic materials, especially polymers, glass or metal. Suitable substrates are, for example, glass, plastic, wood, metal, paper, cardboard, PCB's, LCD's, etc. in single sheet or roll-to-roll applications.

BRIEF DESCRIPTION OF THE DRAWINGS

The drawings show.

FIG. 1 depicts a dosing device 10 in a schematic sectional view. The dosing device 10 comprises a reservoir 12, a dosing disc 20 and a suction device 24. The reservoir 12 and the suction device 24 are arranged above the dosing disc 20. The dosing disc 20 may rotate around a vertical rotation axis 22.

Figure 1:
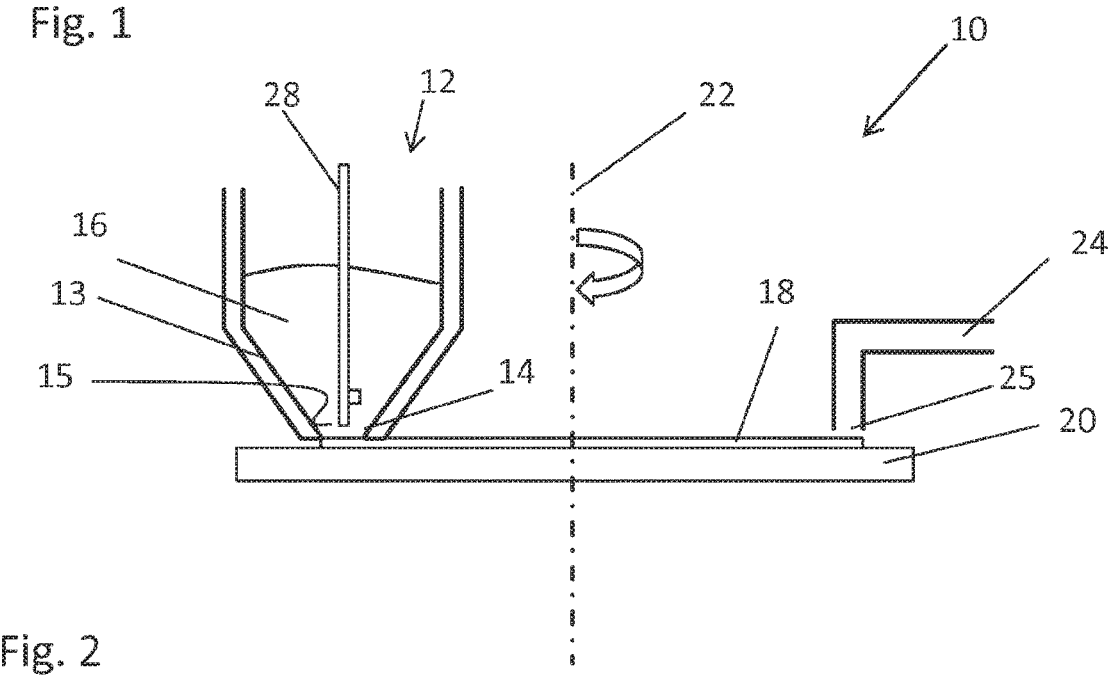
FIG. 1 a dosing device in a schematic sectional view,
FIG. 2 the dosing device in a perspective view,
FIG. 3 delivery of particles onto a dosing disc,
FIG. 4 delivery of particles onto a patterned dosing disc,
FIG. 5 schematic overview of a spraying device,
FIG. 6 a cross section view of a liquid crystal cell, and
FIG. 7 spacer distribution and test fields on a substrate.

The reservoir 12 comprises a funnel section 13 leading towards a dosing opening 14. The dosing opening 14 faces the upper surface of the dosing disc 20. Inside the reservoir 12 granular material 16 is stored. The granular material 16 is delivered through the dosing opening 14 onto the dosing disc 20 by means of gravitation. In the embodiment of FIG. 1, an agitator 28 is mounted within reservoir 12 in order to support the delivery of the granular material 16. In order to avoid generation of conductive particles by the agitator 28 scraping the inner wall 15 of the reservoir 12, at least the part of the inner wall 15 which is in the vicinity of the agitator 28 is preferably made from a non-conductive material.

Granular material 16 is delivered onto the dosing disc 20 in form of a monolayer 18 of granular material 16. The monolayer 18 is transported from the underside of the dosing opening 14 to the suction device 24 by means of rotating the dosing disc 20.

The suction device 24 has an opening 25 facing the dosing disc 20. Inside the suction device 24, the gas pressure is reduced with respect to the gas pressure in the vicinity of the dosing disc 20 so that a stream of gas is sucked into the suction device. The stream of gas drags particles of the monolayer 18 along into the suction device 24 generating a mixture of gas and particles. The gas is, for example, dry air or nitrogen.

By means of the monolayer 18, a defined amount of particles of the granular material 16 is transported to the suction device 24 and is then mixed with a defined amount of gas so that a mixture of gas and particles having a defined particle density with low deviations is formed.

As can be seen from FIG. 1, a plane of the dosing opening 14 as well as a plane of the opening 25 of the section device 24 are orientated parallel to the plane of the dosing disc 20. Further, both the reservoir 12 as well as the suction device 24 are arranged eccentrically with respect to the rotation axis 22. The center of the dosing opening 14 and the center of the opening 25 of the suction device 24 have the same distance from the rotation axis 22.

Figure 2:
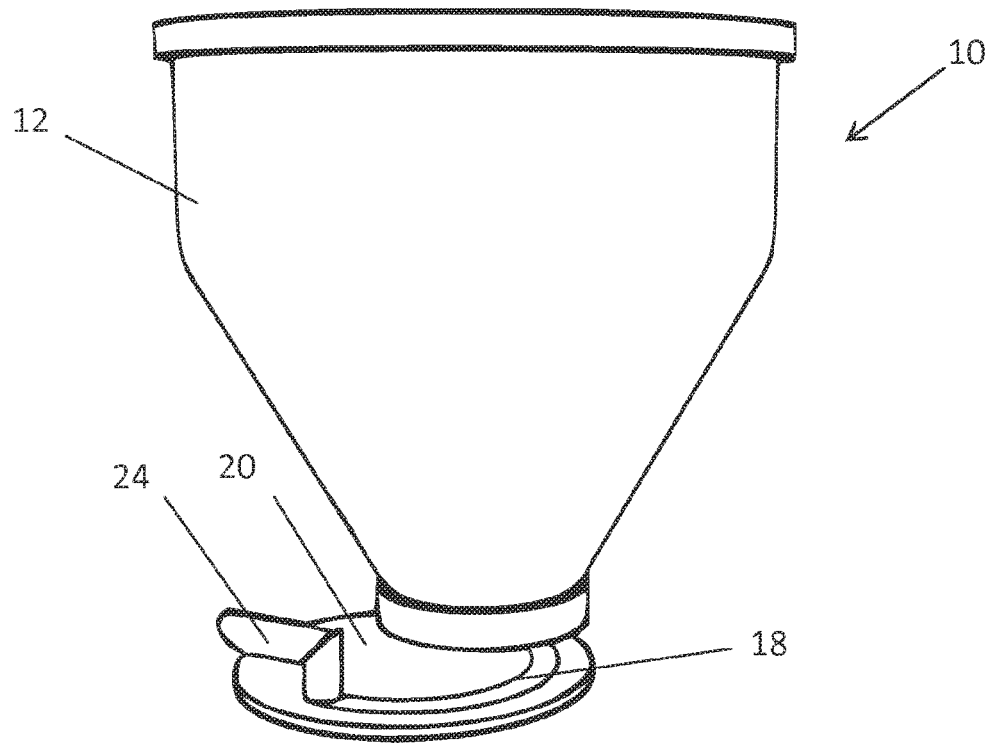

FIG. 2 shows a perspective view of the dosing device 10. The reservoir 12 and the suction device 24 are mounted above the dosing disc 20. The reservoir delivers a monolayer 18 of granular material onto the dosing disc 20. The monolayer 18 of granular material is transported from below the reservoir 12 towards a position below the suction device 24 by means of rotating of the dosing disc 20. A gas stream, such as air or nitrogen flows into the suction device 24 and carries the particles of the monolayer 18 into the suction device 24.

Figure 3:
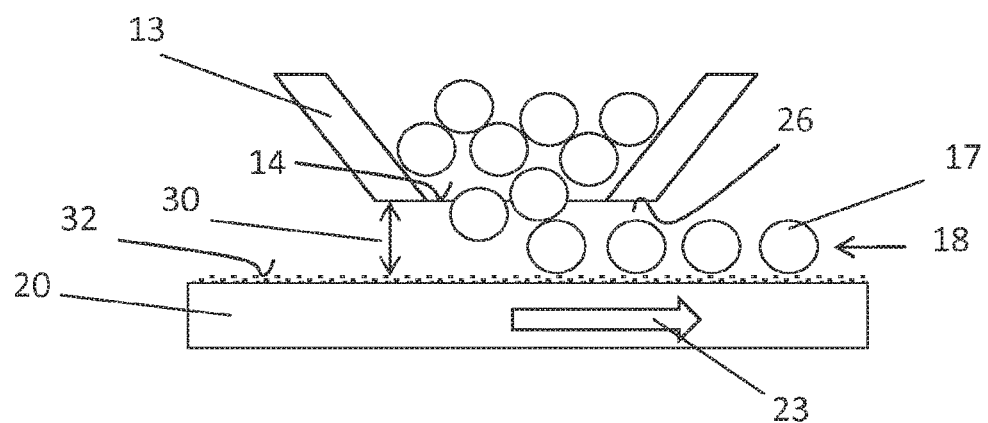

FIG. 3 shows an enlarged schematic view of the delivery of particles onto the dosing disc 20. The funnel section 13 of the reservoir 12 leads towards the dosing opening 14 which is arranged above the surface of the dosing disc 20. The dosing opening 14 is mounted at a distance 30 from the surface of the dosing disc 20 and forms a dosing gap.

Particles 17 of the granular material drop out of the reservoir 12 through the dosing opening 14 onto the surface of the dosing disc 20. By means of rotation of the dosing disc 20, the particles 17 are moved away from below the dosing opening 14. The direction of rotation is indicated by an arrow 23. In the example shown in FIG. 3, the particles 17 have a spherical shape so that their size is defined by their diameter.

The size of the dosing gap is chosen such that only a monolayer 18 of particles 17 may be transported by the dosing disc 20. The surface 26 surrounding the dosing opening 14 acts like a squeegee. The squeegee blocks any further layers of particles 17 from following the rotation of the dosing disc 20 and thus blocks the transport of further particles to the suction device 24.

Preferably, the size of the dosing gap is chosen such that the distance between the dosing opening 14 and the surface 26 of the dosing disc 20 is larger than the diameter of the particles 17 and smaller than or equal to twice the diameter of the particles 17. Due to the chosen size of the dosing gap the surface 26 or squeegee wipes off any particles 17 in excess of those particles 17 forming the monolayer 18.

In the embodiment shown if FIG. 3, the surface of the dosing disc 20 has a roughness 32 in order to provide sufficient friction so that the particles 17 stay in place when the dosing disc 20 rotates. Preferably, the surface roughness Ra of the dosing disc 20 is in the range of from 0.1 to 4 µm, especially preferred in the range of from 2 to 3.5 µm. Ra is the arithmetic average of the surface roughness measured along a line profile.

Figure 4:
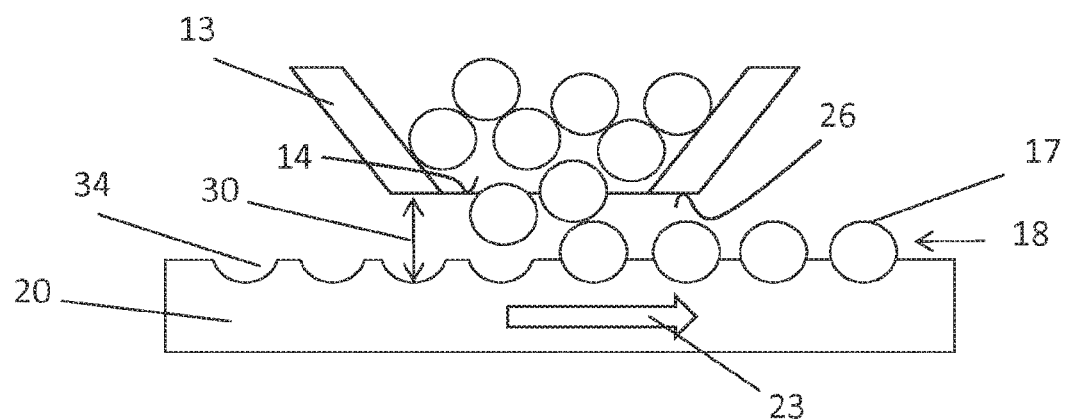

In FIG. 4 an alternative embodiment of the dosing disc 20 is shown. The surface of the dosing disc 20 is patterned and features a plurality of indentations 34. The indentations 34 match the shape of the particles 17 of the granular material such that exactly one particle 17 fits into one of the indentations 34. The distance of the dosing opening 14 to the surface of the dosing disc 20 is measured from the bottom of the indentations to the dosing opening 14.

As already described with respect to FIG. 2, the dosing disc 20 rotates as indicated by the arrow 23 and transports particles 17 from below the dosing opening 14 to the suction device 24. The surface 26 surrounding the dosing opening 14 wipes off any excess particles which may form additional layers in excess of the monolayer 18.

Figure 5:
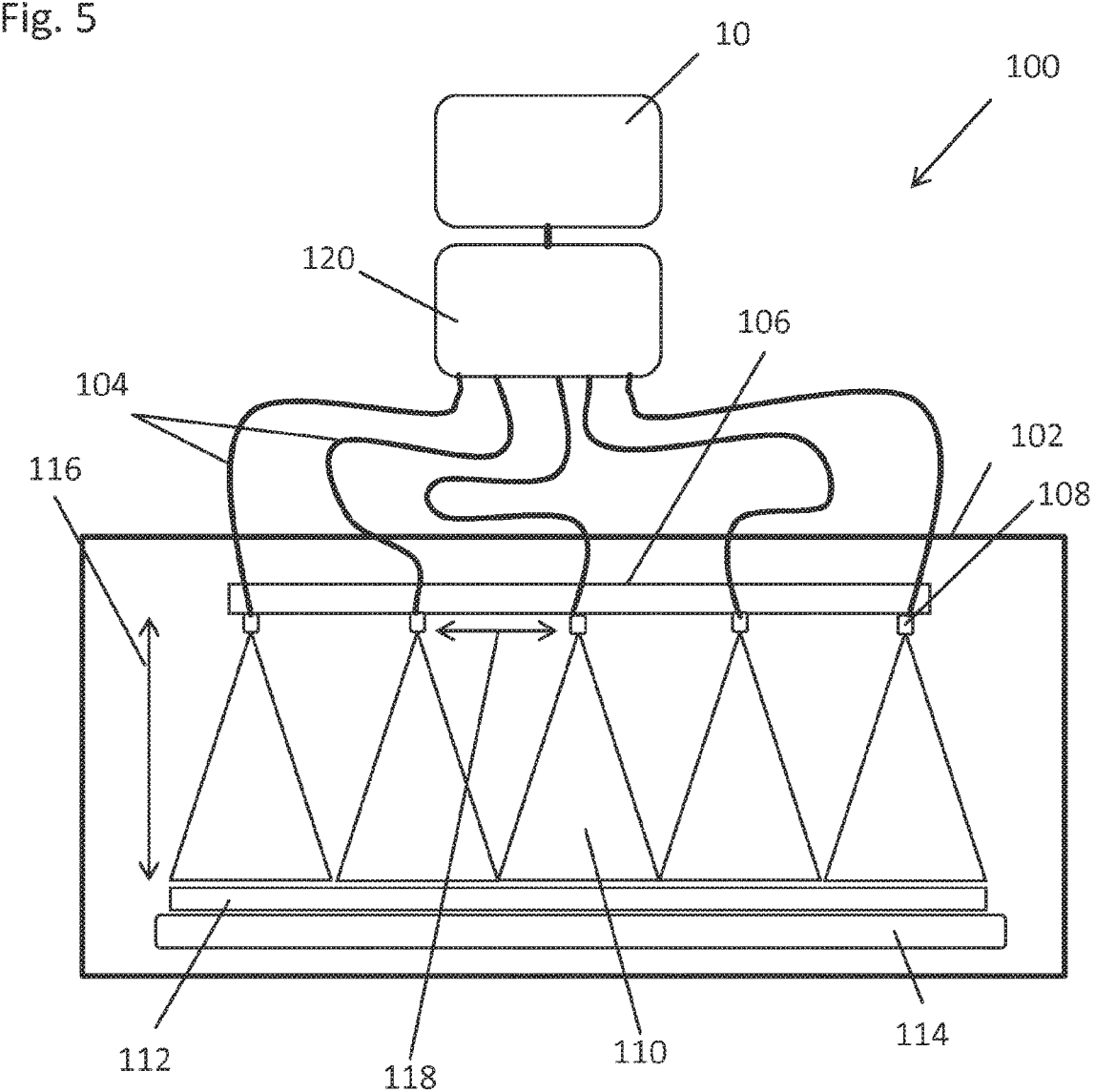

FIG. 5 shows a spraying device 100 comprising a dosing device 10, a distributor 120 and a spraying chamber 102. Inside the spraying chamber 102 several nozzles 108 are mounted onto a spray bar 106. Further, a conveyor 114 is arranged inside the spraying chamber 102 and configured to receive a substrate 112 and to transport the substrate 112 through the spraying chamber 102.

Each nozzle 108 is connected to the distributor 120 through a separate supply line 104. The dosing device 10 is connected to the distributer 120 and supplies a mixture of gas and particles 17 of the granular material to the distributor 120.

Each of the nozzles 108 is configured to produce an aerosol spray 110 having a defined opening angle. The distance 116 between the nozzles 108 and the substrate 112 as well as the distance 118 between two of the nozzles 108 are chosen such that the aerosol sprays 110 cover the entire width of the substrate 112 while an overlap between aerosol sprays 110 of two nozzles 108 or gaps between the aerosol sprays 110 are avoided.

In order to coat a surface of the substrate 112 with particles 17 of the granular material, the substrate 112 is moved through the aerosol sprays 110 by means of the conveyor 114. The density of the particles 17 on the surface of the substrate 112 may be controlled by adjusting the supplied mixture of gas and particles and by adjusting the movement speed of the conveyor 114.

The process of coating the surface of the substrate 112 is performed inside the spraying chamber 102. The spraying chamber 102 contains any excess particles which are not delivered to the substrate 112 in order to avoid contamination of the environment.

Figure 6:
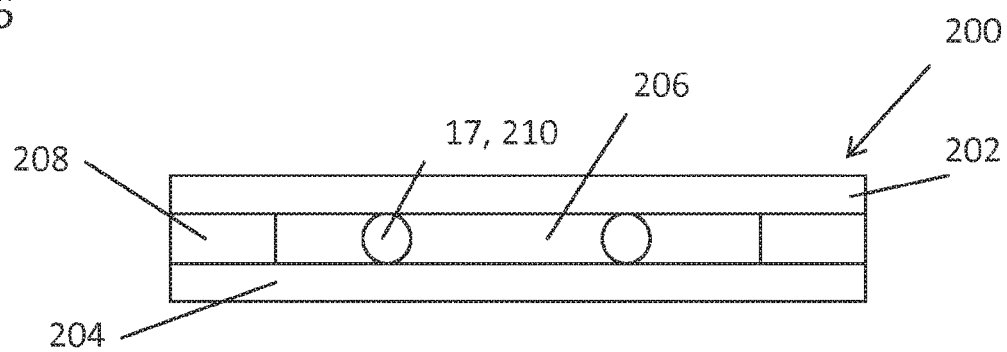

FIG. 6 shows an example of a liquid crystal device 200. The liquid crystal device 200 comprises a first substrate 202, a second substrate 204 and liquid crystalline layer 206 sandwiched between the two substrates 202, 204. Particles 17 are placed between the two substrates 202, 204 and act as spacers 210 to maintain a gap between the two substrates 202, 204 of constant width. The liquid crystal is located inside the formed gap. The liquid crystal device 200 additionally comprises a seal 208 which closes the gap.

Figure 7:
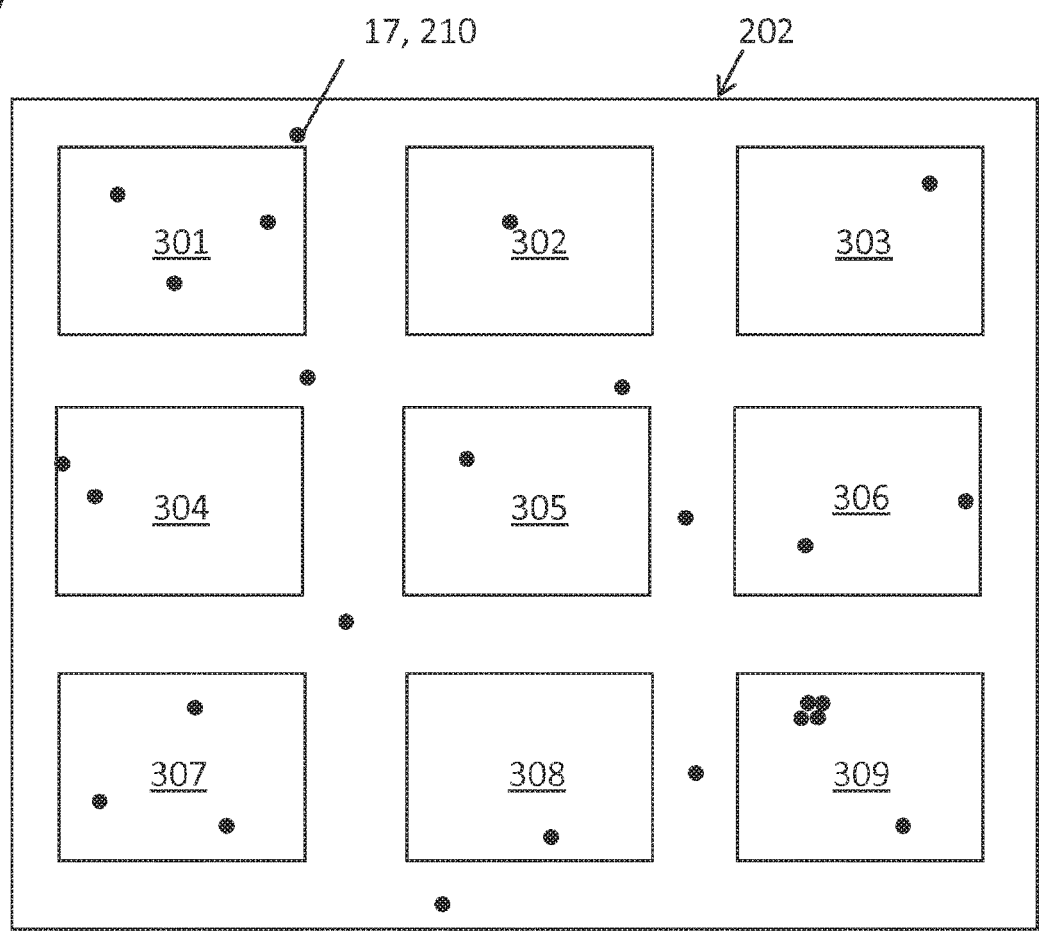

FIG. 7 shows the distribution of particles 17 acting as spacers on a first substrate 202. The distribution of the spacers must be uniform in order to guarantee a constant gap width in a liquid crystal device 200. For analysis, nine test fields 301 to 309 have been distributed over the surface of the first substrate 202. The number of particles 17 in each of the test fields 301 to 309 is determined by taking a microscopy image of the respective test field and counting the particles 17 in the microscopy image.

The number and distribution of particles 17 in each of the test fields is analyzed. If the number of particles 17 in a field is too low, forces exerted onto the liquid crystal device 200 may compress the gap in this field. The width of the gap is then smaller than intended resulting in visible defects of the liquid crystal device 200. If the number of particles 17 in a test field is too high, the properties of the liquid crystal surrounding the particles may be disturbed resulting in visible optical defects of the liquid crystal device.

Further, clusters of particles 17 must be avoided. Clusters are agglomerates of two or more particles 17. These clusters are usually large enough to be visible to the naked eye and are thus a visible optical defect. In the field #309 a cluster of 4 particles 17 is depicted.

EXAMPLES

A spraying device having 16 nozzles arranged on a spray bar is used to coat glass substrates with a testing powder. The distance between two nozzles (nozzle pitch) is set to 94 mm. Thus, the maximum width of a substrate which may be coated with this testing setup is about 1500 mm. The powder particles are located in a reservoir of a dosing device. The dosing device is used to provide a mixture of gas and spacer particles to the spraying device.

The dosing opening and the opening of the suction device of the dosing device are mounted at a distance of 20 mm from the axis of rotation. The rotation speed of the dosing disc, the size of the dosing gap between the surface of the dosing disc and the dosing opening are adjustable. As suction device, a Venturi nozzle is used with an adjustable Venturi pressure.

The distance between the nozzles and the glass substrate is adjustable. A conveyor belt is used to move the glass substrates relative to the nozzles.

For analysis of the achieved distribution of particles, a microscopy camera imaging an area of about 5 mm$^2$ is placed on different positions on the substrate. The image of the microscope camera is acquired using a USB microscope and then analyzed. In a recorded frame, the number of particles is counted for each of the tested positions. Further, the presence of clusters of more than one particle is recorded.

Four glass substrates of size 400 mm×400 mm are coated with polyimide. The polyimide is rubbed in order to create an alignment layer for liquid crystals.

In this example, the anti set-off powder S5/20 available from KSL staubtechnik gmbh, Germany is used as a testing powder. This powder used is based on native starch. The median particle size is 20.6 µm and the amount of particles having a size of less than 10 µm is 6.3% by volume.

16 nozzles are used and the distance of the nozzles to the substrate glass is set to 200 mm and the speed of the conveyor is set to move the glass substrate relative to the nozzles at a speed of 6 m/min.

The dosing device is operated with the rotation speed of the dosing disc set to 5 rpm and a size of the dosing gap of 30 µm. The Venturi pressure is set to 0.45 bar.

Nine measurement fields having an imaging area of about 5 mm$^2$ are evenly distributed in three rows (A, B, C) and three columns (1, 2, 3) over the surface of the glass substrates. The number of spacers in each field is counted and clustering is recorded. The measurement results are listed in tables 1 to 4. The average number of particles in a field for each of the substrates as well as the respective standard deviation is given in table 5. Clustering of the particles is not observed.

TABLE 1

|   | 1  | 2  | 3  |
|---|----|----|----|
| C | 9  | 16 | 12 |
| B | 9  | 3  | 8  |
| A | 11 | 6  | 11 |

TABLE 2

|   | 1 | 2 | 3 |
|---|---|---|---|
| C | 4 | 9 | 6 |
| B | 6 | 5 | 7 |
| A | 4 | 5 | 3 |

TABLE 3

|   | 1  | 2  | 3  |
|---|----|----|----|
| C | 8  | 4  | 6  |
| B | 10 | 4  | 6  |
| A | 10 | 14 | 12 |

TABLE 4

|   | 1  | 2  | 3  |
|---|----|----|----|
| C | 12 | 10 | 13 |
| B | 11 | 11 | 5  |
| A | 12 | 9  | 6  |

TABLE 5

| Substrate number | Average number of particles | Standard deviation |
|---|---|---|
| 1 | 9.4 | 3.5 |
| 2 | 5.4 | 1.7 |
| 3 | 8.2 | 3.3 |
| 4 | 9.9 | 2.6 |

LIST OF REFERENCE NUMERALS 10 dosing device
12 reservoir
13 funnel
14 dosing opening
15 inner wall
16 granular material
17 particle of granular material
18 monolayer of granular material
20 dosing disc
22 rotation axis
23 direction of rotation
24 suction device
25 opening
26 surface
28 agitator
30 dosing gap
32 surface roughness
34 indentations
100 spraying device
102 spraying chamber
104 supply line
106 spray bar
108 spray nozzle
110 aerosol spray
112 substrate
114 conveyor
116 distance from nozzle to substrate
118 nozzle stitch
120 distributor
200 liquid crystal device
202 first substrate
204 second substrate
206 liquid crystalline layer
208 seal
210 spacer

The invention claimed is:

1. A spraying device (100) for applying a granular material (16) to a surface of a substrate (112), the spraying device (100) comprising a dosing device (10), the dosing device (10) supplying a gas stream comprising the granular material (16), at least one nozzle (108), at least one supply line (104) connecting the dosing device (10) to the at least one nozzle (108) and means for moving a substrate (112) relative to the at least one nozzle (108), wherein the spraying device (100) comprises means for electrostatically charging the particles (17) of the granular material (16), and wherein the dosing device (10) comprises
a reservoir (12) for storing the granular material (16),
a dosing disc (20), and
a suction device (24), wherein
the dosing disc (20) is rotatable around a rotational axis (22),
the reservoir (12) has a dosing opening (14) facing the dosing disc (20),
the dosing opening (14) being arranged above the dosing disc (20) such that a dosing gap is formed between a surface of the dosing disc (20) and a surface (26) surrounding the dosing opening (14), the dosing opening (14) being arranged eccentric with respect to the rotational axis (22),
the suction device (24) having an opening (25) facing the dosing disc (20), the opening (25) being arranged above the dosing disc (20) and being arranged eccentric with respect to the rotational axis (22),
the size of the dosing gap being such that a monolayer (18) of the particles (17) of the granular material (16) is dosed from the reservoir (12) through the dosing opening (14) onto the surface of the dosing disc (20),
the suction device (24) being constructed and arranged such that the monolayer (18) of particles (17) is being sucked into the suction device (24) and mixed with a gas stream when the particles (17) are being transported to the suction device (24) by rotation of the dosing disc (20).

2. The spraying device (100) according to claim 1, wherein, in the dosing device (10), the dosing disc (20) has a surface flatness of 0 to 5 μm and/or has a surface roughness in of from 0.1 to 4 μm.

3. The spraying device (100) according to claim 1, wherein, in the dosing device (10), the surface of the dosing disc (20) is patterned such that the surface has a plurality of indentations (34), the shape of the indentations (34) being such that exactly one particle (17) of the granular material (16) fits in one of the indentations (34).

4. The spraying device (100) according to claim 1, wherein, in the dosing device (10), the size of the dosing gap is larger than the average diameter of the particles (17) and smaller than or equal to two times the average diameter of the particles (17).

5. The spraying device (100) according to claim 1, wherein, in the dosing device (10), the suction device (24) is a Venturi nozzle.

6. The spraying device (100) according to claim 1, wherein, in the dosing device (10), the amount of dosed particles (17) is controlled by parameters selected from the rotational speed of the dosing disc (20), the shape of the dosing opening (14), the distance between the axis of rotation (22) and the center of the dosing opening (14) and combinations of at least two of these parameters.

7. The spraying device (100) according to claim 1, wherein, in the dosing device (10), the reservoir (12) comprises an agitator (28) for stirring the particles (17) of the granular material (16) in the vicinity of the dosing opening (14).

8. The spraying device (100) of claim 1, wherein the at least one supply line (104) is at least partially constructed from a conductive material such that the particles (17) are charged by collisions with the conductive material of the at least one supply line (104).

9. The spraying device (100) of claim 1, wherein the spraying device (100) comprises a vibration system constructed and arranged to apply vibrations to the at least one nozzle (108).

10. The spraying device (100) of claim 1, wherein the distance of the at least one nozzle (108) to the substrate (112) is 25 mm to 500 mm.

11. The spraying device (100) of claim 1, wherein the opening angle of the at least one nozzle (108), the distance of the at least one nozzle (108) to the substrate (112) and, if more than one nozzle is present, the distance between two nozzles (108) are such that an aerosol spray (110) comprising the granular material (16) is generated by the at least one nozzle (108), wherein the aerosol spray (110) covers the entire width of the substrate (112) and wherein no overlap is present between the aerosol sprays (110) generated by two nozzles (108) if more than one nozzle (108) is present.

12. The spraying device (100) of claim 1, wherein the spraying device (100) comprises at least two nozzles (108), wherein each nozzle (108) is connected to the dosing device (10) via a supply line (104) and wherein the supply lines (104) of all nozzles (108) are of equal length.

13. The spraying device (100) of claim 1, wherein the spraying device (100) comprises a spraying chamber (102), wherein the at least one nozzle (108) is located inside the spraying chamber (102), the spraying chamber (102) being constructed to receive the substrate (112) and the spraying chamber (102) being constructed to contain excess particles of the granular material (16).

14. The spraying device (100) of claim 1, wherein the spraying device (100) comprises a spraying chamber (102), wherein the at least one nozzle (108) is located inside the spraying chamber (102), the spraying chamber (102) being constructed to receive the substrate (112) and the spraying chamber (102) being constructed to contain excess particles of the granular material (16).

15. A method for applying a granular material (16) to a surface of a substrate (112), the method comprising supplying the granular material (16) and the substrate (112) to a spraying device (100), and applying the granular material (16) to the surface of the substrate (112) by the spraying device (100),
wherein the substrate (112) is a substrate of a switchable window,
wherein the spraying device (100) comprises a dosing device (10), the dosing device (10) supplying a gas stream comprising the granular material (16), at least one nozzle (108), at least one supply line (104) connecting the dosing device (10) to the at least one nozzle (108) and means for moving a substrate (112) relative to the at least one nozzle (108),
and wherein the dosing device (10) comprises
a reservoir (12) for storing the granular material (16),
a dosing disc (20), and
a suction device (24), wherein
the dosing disc (20) is rotatable around a rotational axis (22),
the reservoir (12) has a dosing opening (14) facing the dosing disc (20),
the dosing opening (14) being arranged above the dosing disc (20) such that a dosing gap is formed between a surface of the dosing disc (20) and a surface (26) surrounding the dosing opening (14), the dosing opening (14) being arranged eccentric with respect to the rotational axis (22),
the suction device (24) having an opening (25) facing the dosing disc (20), the opening (25) being arranged above the dosing disc (20) and being arranged eccentric with respect to the rotational axis (22),
the size of the dosing gap being such that a monolayer (18) of the particles (17) of the granular material (16) is dosed from the reservoir (12) through the dosing opening (14) onto the surface of the dosing disc (20),
the suction device (24) being constructed and arranged such that the monolayer (18) of particles (17) is being sucked into the suction device (24) and mixed with a gas stream when the particles (17) are being transported to the suction device (24) by rotation of the dosing disc (20).

16. The method of claim 15, wherein the substrate (112) is a substrate of an optical device (200) and the particles (17) of the granular material (16) are spacers (210) for separating two substrates of the optical device (200).

17. The method of claim 15, wherein the granular material (16) is mixed with nitrogen gas in the dosing device (10) of the spraying device (100).

18. The method of claim 15, wherein the means for moving the substrate (112) relative to the at least one nozzle (108) is achieved by a conveyor or substrate carrier.

19. A spraying device (100) for applying a granular material (16) to a surface of a substrate (112), the spraying device (100) comprising a dosing device (10), the dosing device (10) supplying a gas stream comprising the granular material (16), at least one nozzle (108), at least one supply line (104) connecting the dosing device (10) to the at least one nozzle (108) and a conveyor or substrate carrier for moving a substrate (112) relative to the at least one nozzle (108),
wherein the spraying device (100) comprises at least one supply line which is at least partially constructed from an electrically conductive material such that the particles are charged by collisions with the conductive material of the supply line thereby electrostatically charging the particles (17) of the granular material (16),
and wherein the dosing device (10) comprises
a reservoir (12) for storing the granular material (16),
a dosing disc (20), and
a suction device (24), wherein
the dosing disc (20) is rotatable around a rotational axis (22),
the reservoir (12) has a dosing opening (14) facing the dosing disc (20),
the dosing opening (14) being arranged above the dosing disc (20) such that a dosing gap is formed between a surface of the dosing disc (20) and a surface (26) surrounding the dosing opening (14), the dosing opening (14) being arranged eccentric with respect to the rotational axis (22),
the suction device (24) having an opening (25) facing the dosing disc (20), the opening (25) being arranged above the dosing disc (20) and being arranged eccentric with respect to the rotational axis (22),
the size of the dosing gap being such that a monolayer (18) of the particles (17) of the granular material (16) is dosed from the reservoir (12) through the dosing opening (14) onto the surface of the dosing disc (20),
the suction device (24) being constructed and arranged such that the monolayer (18) of particles (17) is being sucked into the suction device (24) and mixed with a gas stream when the particles (17) are being transported to the suction device (24) by rotation of the dosing disc (20).

20. The spraying device (100) of claim 19, wherein the spraying device (100) comprises a vibration system constructed and arranged to apply vibrations to the at least one nozzle (108).

* * * * *